United States Patent Office 3,826,617
Patented July 30, 1974

3,826,617
METHOD FOR DETERMINING SUGAR/STARCH CONTENTS IN AQUEOUS SOLUTIONS
Roy M. Chatters, Pullman, Wash., James E. Kimbrell, Monroeville, Pa., and Shelby D. Slater, Pullman, Wash., assignors to the United States of America as represented by the United States Atomic Energy Commission
No Drawing. Filed Oct. 31, 1972, Ser. No. 302,452
Int. Cl. G01n 23/00, 33/18
U.S. Cl. 23—230 M      6 Claims

ABSTRACT OF THE DISCLOSURE

A method for determining simple reducing sugar concentration in aqueous solutions comprises rendering the solution strongly basic, adding a solution consisting of potassium iodide and $^{203}HgI_2$ to the basic solution, heating the resulting solution to an elevated temperature near boiling for a period of time to reduce the radio-mercury to elemental mercury, sorbing said elemental mercury on diatomaceous earth, separating the diatomaceous earth-mercury solids and thereafter analyzing the retained solids for $^{203}Hg$. In an alternative embodiment, nonradioactive mercury (as mercury iodide) may be used with neutron activation to form a radio-mercury isotope, such as $^{203}Hg$, which can then be analyzed. Starch concentration may also be determined by first converting any starch present to a simple reducing sugar by enzymatic hydrolysis and the thus formed sugar concentration determined by this method.

BACKGROUND OF THE INVENTION

The invention described herein was made in the course of, or under, a contract with the United States Atomic Energy Commission. The present invention relates generally to analytical methods for determining concentrations of selected materials in aqueous solutions and more particularly to a method for determining sugar/starch concentration in aqueous solutions, such as paper mill effluents.

Much concern is presently evidenced over the quality of our water streams. In this regard one source of contaminants to streams are the various additives employed by paper mills as necessary adjuncts to the manufacture of the many varieties of paper produced to meet diverse demands of the consumer. Quantitatively, the paper industry consumes over 40% of all starches produced by the wet-milling industry in the United States which amounts to approximately 1,100,000 tons.

These additives may adversely affect the oxygen balance of effluent receiving waters, impart undesirable colors, tastes and odors or produce toxic effects. Added to these considerations are the economic losses which may be suffered by the paper manufacturer through incomplete utilization of the additives purchased at considerable cost.

While many monitoring techniques have heretofore been devised to determine content of effluents, all have been unsatisfactory for one reason or another. The conventional chemical analytical techniques, for example, have several disadvantages, such as lack of sensitivity, lack of specificity, poor shelf life of reagents and nonlinearity of correlation between sugar and resultant precipitate. Moreover such techniques generally require analytical equipment which is incompatible with field operations.

It is therefore desirable and a primary object of this invention to provide a technique for analyzing aqueous solutions for sugar/starch concentration which is simple, rapid and reliable.

SUMMARY OF THE INVENTION

Briefly, the present invention comprises the steps of rendering a sugar-containing aqueous solution strongly basic, adding a solution consisting of potassium iodide and $^{203}HgI_2$ to the basic solution, heating the resulting solution to an elevated temperature near boiling to thereby reduce the radio-mercury to elemental mercury by said sugar, sorbing said elemental mercury on diatomaceous earth, separating the diatomaceous earth-mercury solids and thereafter analyzing said solids for $^{203}Hg$. In an alternative embodiment nonradioactive mercury (as mercury iodide) may be used and is converted by neutron activation to a radio-mercury isotope such as $^{203}Hg$. Where starches are present in aqueous solutions, such as effluents from paper mills, the starches are first converted to reducing sugars by enzymatic hydrolysis and the reducing sugar's content (and indirectly the starch content) determined by this method. The reduction ratio between mercury and sugar was determined to be 2.46 with a standard deviation of 0.35. Glucose contents (p.p.m.) in paper mill effluents determined by this mercury-diatomaceous earth method ranged from 50 to 76 and starch contents (p.p.m.) ranged from 4 to 209.

DESCRIPTION OF THE PREFERRED EMBODIMENTS

The method of this invention is broadly applicable to analyzing aqueous solutions for simple reducing sugars and starch. Aqueous solutions containing starch and/or simple reducing sugars are initially filtered to remove any solids present. While it will be appreciated that the solutions may contain other materials, such as soluble salts, i.e., calcium, sodium, potassium and aluminum salts, no special precaution need be taken to remove any of these salts from the aqueous solution sample. The starch present should be converted to simple reducing sugars. This may be done by any conventional method, such as by hydrolysis with suitable enzymes.

The aqueous solution is next rendered strongly basic. While the pH of the aqueous solution may vary over a wide range of alkaline pH values, it is preferred that the aqueous solution have a pH of about 10; lower alkaline pH values result in a decrease of sensitivity of the present method. For this any conventional alkaline reagent may generally be used, such as potassium hydroxide or sodium hydroxide. It should be noted that where neutron activation is performed as a subsequent step, sodium hydroxide should not be used as the alkaline reagent inasmuch as it will interfere with the analysis due to the production of $^{24}Na$. Where potassium hydroxide is used as the alkaline reagent, the analysis should preferably be completed within two hours of addition. After about two hours the potassium hydroxide tends to convert a portion of the simple sugar to a nonreducing compound.

After rendering the aqueous solution strongly basic, a solution containing mercury iodide and potassium iodide is added to the resulting solution. It is necessary here to provide a reagent which will increase the solubility of mercury iodide in water. Potassium iodide is quite suitable but other compounds may be employed.

In accordance with this invention the sugar concentration is determined by sorbing the free-mercury which is reduced by the sugar on diatomaceous earth and determining the concentration of the radio-mercury sorbed on the diatomaceous earth. The reduction of mercuric iodide to metallic mercury is accomplished by heating the solution to near boiling. While the mixed aqueous solution containing the mercuric iodide and potassium iodide may be heated directly, the simplest method is to add a quantity of diatomaceous earth at the same time as the mercuric iodide solution and bring to a boil. The concentration of sugar originally present has been found to be proportional to the radio-mercury sorbed. The diatomaceous earth serves as an absorptive or adsorptive material to pick up the mercury produced as a result of the reduction of $HgI_2$ to free-mercury.

The mercury ions may be either a radio-mercury isotope, e.g., $^{197}Hg$, $^{203}Hg$ or $^{205}Hg$, or nonradioactive stable mercury ($MgI_2$). In the latter case the stable mercury sorbed on the diatomaceous earth must first be converted into radio-mercury by neutron activation. This procedure is quite well known and for conversion of stable mercury to radio-mercury $^{203}Hg$ it may be effected by exposure to a flux of approximately $5 \times 10^{12}$ neutrons/cm.$^2$-sec. for 1 to 5 minutes. Of the radio-mercury isotopes isotope $^{203}Hg$ is preferred. It has a 48-day half-life which enables this analytical process to be completely portable.

Conventional equipment may be used to determine the activity of the free-radio-mercury which is sorbed on the diatomaceous earth. Where neutron activation is employed the reduced mercury concentration which is sorbed on the diatomaceous earth may be determined with a pulse height analyzer and a scintillation crystal well counter. Advantageously, with the radio-mercury method, the only isotope present is the desired mercury and the analysis may be made without the large, expensive, and usually non-portable pieces of equipment required where neutron activation is used. Accordingly, where radio-mercury is used, the concentration of the reduced mercury sorbed on the diatomaceous earth may readily be determined with inexpensive equipment, such as gas flow detectors with simple scalers.

Starch concentration is also readily determined by this analytical method and equipment. The sugar produced from the starch was found by subtracting the initial sugar concentration from the sugar concentration after enzymatic hydrolysis.

Having described the invention in a general fashion the following examples are given by way of illustration to further describe in greater detail the present analytical technique for determining sugar starch concentrations in aqueous solutions.

Example I

The value for glucose to mercury reduction ratio was determined as follows: 500 mg. of reagent grade D glucose were added to a 500 ml. volumetric flask. Distilled water was added to bring the volume up to 500 ml., giving a solution 1 mg. glucose/ml. A 5 ml. aliquot of the glucose solution was pipetted into each of two 250 ml. beakers containing 100 ml. distilled water.

Five (5) ml. of solution A which was prepared by dissolving 130 gm. of potassium hydroxide in distilled water and diluting to 500 ml. (5 N potassium hydroxide), were added to each of the 250 ml. beakers. Solution B (mercuric iodide solution) was prepared by activating 1.0 gm. of $HgCl_2$ in a reactor neutron flux of $10^{12}$ neutrons/cm.$^2$-sec. for 3 hours. Two (2) gm. of potassium iodide were added to the activated $HgCl_2$ and a few ml. of distilled water was added. The mixture was stirred a few seconds and then filtered through #42 Whatman filter paper. The precipitate, $HgI_2$, was washed with distilled water and mixed with 16.4 gm. of nonradioactive $HgI_2$ and 75 gm. of potassium iodide, dissolved in distilled water and diluted to 500 ml. This had a $^{197}Hg$ activity of 1.4μ Ci/ml. and a $^{203}Hg$ activity of 0.61μ Ci/ml.

Five (5) ml. of this solution was added to each of the two 250 ml. beakers as noted hereinbefore. The two breakers were next heated in a boiling water bath for five minutes. A quantity (0.1 gm.) of diatomaceous earth was added to each of the beakers and mixed in by swirling. The beakers were cooled 1.5 hrs. in a cool water bath. The samples were filtered through a #50 Whatman filter paper and the precipitate washed thoroughly with distilled water.

Each of the filter papers containing the reduced Hg was folded and placed in a 2 dram polyethylene vial for counting. The samples were placed on a stage 10 cm. from a 3″ x 3″ NaI (Tl) crystal which was connected to a 400 channel pulse height analyzer. The samples were counted for one minute and the total number of counts in channels 4 to 7 was recorded. This covers the energy range of 60 to 100 kev. and most of the counts in this range were Au X-rays produced from the $^{197}Hg$ decay.

A standard was prepared by pipetting one ml. of solution B which contained 16.0 mg. of Hg into a polyethylene vial and the solution counted as the samples were. A one minute background count was made with no sample in the counting cave and the total number of counts in channels 4 to 7 recorded.

The amount of reduced mercury in the two samples was calculated according to the formula:

$$\text{mg. Hg (sample)} = \frac{\text{counts/min. sample} - \text{background/min.}}{\text{counts/min. std.} - \text{background/min.}} \times 16.0 \text{ mg. Hg}$$

The ratio of the weight of reduced mercury to the initial amount of glucose was calculated and is given in Table I below.

TABLE I.—RATIO OF REDUCED Hg TO GLUCOSE

| Initial amount D-glucose | Counts in 77 kev. peak | Mg. of Hg | Ratio $\left(\frac{Hg}{D\text{-glucose}}\right)$ |
|---|---|---|---|
| Standard | 10,968 | 16.0 | |
| Background | 232 | 00 | |
| 5 mg | 10,096 | 14.7 | 2.94 |
| | 9,588 | 13.9 | 2.78 |

Example II

A second experiment was performed as given in Example I, except as follows. Four different volumes of the glucose solution were used in four different beakers. The first contained 1 ml. of glucose solution, the second 2 ml., the third 5 ml. and the fourth 10 ml. The glucose solution volumes were pipetted into breakers containing 100 ml. of distilled water. The same equipment was used for counting, but samples were counted 10 minutes and the counts recorded were those in channels 23 to 28. This covers the energy range of 250 to 310 kev. Counts in this range are mostly due to a 279 kev. gamma emitted in the decay of $^{203}Hg$. Standard and background were also recounted and recorded over the same energy range. The results are given in Table II.

TABLE II.—RATIO OF REDUCED Hg TO GLUCOSE

| Initial amount of D-glucose | Counts in 279 kev. peak | Mg. of Hg | Ratio $\left(\frac{Hg}{D\text{-glucose}}\right)$ |
|---|---|---|---|
| Standard | 13,404 | 16.0 | |
| Background | 760 | | |
| 1 mg | 2,566 | 2.28 | 2.28 |
| 2 mg | 4,051 | 4.16 | 2.08 |
| 5 mg | 9,160 | 10.6 | 2.12 |
| 10 mg | 21,001 | 25.6 | 2.56 |

The average of the reduction ratio of mercury to glucose for the 6 runs (two given in Example I) is 2.46 with the standard deviation ($\sigma$) of 0.35.

Example III

The feasibility of determining the sugar content of a paper mill process and effluent water by the present mercury-diatomaceous earth technique was demonstrated as follows. One liter samples of the effluent water were collected at an area mill. A 100 ml. aliquot of each of the samples was put into a 250 ml. beaker. Five (5) ml. of solution A which was prepared as outlined in Example I and 5 ml. of solution B were pipetted into each of the beakers. Solution B was a non-radioactive mercuric iodide solution and consisted of 75 gm. of potassium iodide and 18 gm. of mercuric iodide dilute to 500 ml. with distilled water.

The beakers were heated in a boiling water bath for 5 minutes and 0.1 gm. of diatomaceous earth added to each of the beakers and mixed by swirling. The beakers were then cooled 1.5 hours in a cool water bath.

The samples were filtered through #50 Whatman filter paper and the precipitate washed thoroughly with distilled water. Each of the filter papers containing the reduced mercury was folded and placed in a 2 dram polyethylene vial for activation and counting.

The samples were then activated along with several others in a TRIGA reactor at a flux of $10^{12}$ neutrons/cm.$^2$-sec. for 5 minutes. Samples were placed ten (10) to an activation bottle. Five activations were made. A standard consisting of 11.34 mg. of $HgCl_2$ was included in one of these activations. Weighed amounts of copper wire were used as flux monitors to relate all samples to this standard. The copper flux monitors were counted using a 3" x 3" NaI (T1) crystal and 400 channel analyzer. The total number of counts in the 511 Kev. peak was recorded for each monitor. Each flux monitor weighed about 1 mg. and was weighed to an accuracy of ±0.002 mg. on an electrobalance.

After 9 days decay, a 1½" by 2" NaI (T1) well counter and scaler were used to count the Hg in the samples. A few samples were counted on the 3" x 3" NaI (T1) crystal with pulse height analyzer to make sure that $^{203}$Hg and $^{197}$Hg were the only radionuclides of significance left in the samples.

The amount of mercury in each sample was determined by the following formula:

$$\text{mg. Hg (sample)} = \frac{\text{activity sample}}{\text{activity std.}} \times \text{mg. Hg (std.)} \times \frac{\text{F std.}}{\text{F sample}}$$

where:

$$\text{F std.} = \frac{\text{activity of flux monitor near std.}}{\text{weight of flux monitor near std.}}$$

$$\text{F sample} = \frac{\text{activity of flux monitor near sample}}{\text{weight of flux monitor near sample}}$$

The mg. of glucose was then obtained using the relation:

$$\text{mg. of glucose} = \frac{\text{mg. of Hg}}{2.5}$$

and the p.p.m. glucose obtained by multiplying the mg. glucose by 10. The results are given in Table III below.

TABLE III
[Sugar content (p.p.m.) in paper mill effluent]

| Type of sample | Time of collection (p.m.) | Mg. of Hg | Mg. of glucose | Glucose, p.p.m. |
|---|---|---|---|---|
| WW | 2:00 | 15.36 | 6.1 | 61 |
| | 3:00 | 14.84 | 5.9 | 59 |
| | 4:00 | 15.75 | 6.3 | 63 |
| | 5:00 | 12.41 | 5.0 | 50 |
| EFF | 2:00 | 15.29 | 6.1 | 61 |
| | 4:00 | 21.63 | 8.6 | 86 |
| | 5:00 | 18.49 | 7.4 | 74 |
| | (1) | 19.00 | 7.6 | 76 |

[1] 8 hr. composite.

NOTE.—WW refers to white water (mill process waters) and EFF refers to the effluent water from a paper mill.

Example IV

A second aliquot from each of the same water samples taken in Example III was tested for starch as follows. One hundred (100) ml. of each sample were poured into a 250 ml. beaker and each brought to pH=7.0±0.2 with dilute HCl and NaOH. Ten (10) mg. of Rhozyme (commercial starch liquifying enzyme produced by Rohm and Haas Company) was added to each beaker and swirled slightly. The beakers were then placed in a 60° oven.

After five hours, the beakers were removed from the oven. One ml. of Diazyme L30 solution (commercial sac- charifying enzyme solution, strength of 30 units per ml., produced by Miles Laboratories) was added to each and the beakers returned to the 60° oven for 18 hours.

After standing at room temperature for 18 hours, five (5) ml. of solution A which was prepared as outlined in Example I were added to each of the beakers. A radioactive $HgI_2$ solution was prepared similar to the one described in Example I. The radiomercury was allowed to decay for two weeks to eliminate most of the $^{197}$Hg. The solution had a 0.27μ Ci of $^{203}$Hg/ml. Five (5) ml. of this solution was added to each of the beakers.

The beakers were heated in a boiling water bath for five minutes and 0.1 gm. of diatomaceous earth added to each of the beakers and mixed by swirling. The beakers were then cooled 1.5 hours in a cool water bath.

The samples were filtered through #50 Whatman filter paper and the precipitate washed thoroughly with distilled water. Each of the filter papers containing the reduced mercury was folded and placed in a 2 dram polyethylene vial for activation and counting.

The 3" x 3" NaI (T1) crystal in conjunction with a 400 channel pulse height analyzer was used to count the samples for 4 minutes. The counts were integrated over the energy range of 250–310 kev. The standard was 1 ml. aliquot of the $HgI_2$ solution. The white water samples and effluent samples were counted on successive days; thus, necessitating the two counts for the standard and background.

The amount of glucose after enzyme action was determined by the technique given in Example III. The amount of starch in the sample was found using the formula:

$$\text{mg. of starch} = \frac{A-B}{1.11}$$

where:

A=mg. of glucose in sample after enzyme action.
B=mg. of glucose in the sample originally as determined earlier.
1.11=theoretical ratio of wt. of sugar produced to wt. of starch saccharified.

The results are given in Table IV below:

TABLE IV
[Starch content (p.p.m.) in paper mill effluent]

| Type sample | Type, p.p.m. | Counts 279 kev. peak | Milligrams Hg | Glucose [a] | Glucose [b] | Starch | P.p.m. |
|---|---|---|---|---|---|---|---|
| WW | 2:00 | 8,751 | 70.9 | 29 | 6.1 | 21 | 209 |
| | 3:00 | 6,710 | 53.2 | 22 | 5.9 | 14 | 145 |
| | 4:00 | 6,727 | 53.4 | 22 | 6.3 | 14 | 142 |
| | 5:00 | 7,501 | 60.1 | 25 | 5.0 | 18 | 179 |
| Std | | 2,389 | | | | | |
| Background | | 549 | 15.9 | | | | |
| EFF | 2:00 | 2,756 | 20.9 | 8.7 | 6.1 | 2.3 | 23 |
| | 3:00 | 2,464 | 18.3 | 7.6 | 6.5 | 1.0 | 10 |
| | 4:00 | 3,687 | 29.4 | 12.2 | 8.7 | 3.2 | 32 |
| | 5:00 | 2,623 | 19.7 | 8.2 | 7.4 | 0.7 | 7 |
| | [c] 8 hr. | 2,590 | 19.4 | 8.0 | 7.6 | 0.4 | 4 |
| Std | | 2,200 | 15.9 | | | | |
| Background | | 450 | | | | | |

NOTE.—WW refers to white water (mill process waters) and EFF refers to effluent water from a paper mill.
[a] Amount glucose after enzyme action.
[b] Amount glucose initially
[c] Composite sample.

Given the error introduced in the test, the composite effluent and the effluent at 5:00 p.m. contained less starch than can be detected by this means. Effluent samples at 2, 3, and 4:00 p.m. are slightly above the lower limit of starch detection for the test.

What is claimed is:

1. A method for determining sugar concentration in aqueous solution comprising the steps of:
   a. Adding an alkaline reagent to said solution to render the solution strongly basic;

b. adding a solution consisting of potassium iodide and $^{203}HgI_2$ to the basic solution;

c. heating the resulting solution to an elevated temperature near boiling for a short period of time to thereby affect a reduction of said mercury isotope by said sugar to elemental mercury;

d. sorbing said elemental mercury on a quantity of diatomaceous earth;

e. recovering the diatomaceous earth-elemental mercury solids; and f. analyzing the recovered solids for $^{203}Hg$.

2. The method of claim 1 wherein step b is carried out by the addition of potassium iodide and mercuric iodide solution and the method includes the further step of converting the stable mercury to a radio-mercury isotope prior to analysis.

3. The method of claim 2 wherein said conversion step is effected by neutron activation in a neutron flux of about $5 \times 10^{12}$ neutrons/cm.$^2$-sec. for a period of time of 1 to 5 minutes.

4. The method of claim 1 including the further step of converting any starch present in said aqueous solution to simple sugars by enzymatic hydrolysis.

5. The method of claim 1 wherein said heating step is carried out for about five minutes.

6. The method of claim 1 wherein said recovery step is carried out by cooling the heated solution to approximately 20° C. and filtering the cooled solution.

References Cited
UNITED STATES PATENTS

| | | | |
|---|---|---|---|
| 2,408,900 | 10/1946 | Alston et al. | 23—230 M |
| 3,164,534 | 1/1965 | Free | 252—408 X |
| 3,630,958 | 12/1971 | Free et al. | 23—253 TP X |

ROBERT M. REESE, Primary Examiner